US008900424B2

(12) United States Patent
Wei et al.

(10) Patent No.: US 8,900,424 B2
(45) Date of Patent: Dec. 2, 2014

(54) ELECTRODE AND ELECTROCHEMICAL MACHINING PROCESS FOR FORMING NON-CIRCULAR HOLES

(75) Inventors: Bin Wei, Mechanicville, NY (US); Kevin Leon Bruce, Greer, SC (US)

(73) Assignee: General Electric Company, Niskayuna, NY (US)

( * ) Notice: Subject to any disclaimer, the term of this patent is extended or adjusted under 35 U.S.C. 154(b) by 72 days.

(21) Appl. No.: 13/491,700

(22) Filed: Jun. 8, 2012

(65) Prior Publication Data

US 2012/0244010 A1    Sep. 27, 2012

Related U.S. Application Data

(63) Continuation-in-part of application No. 12/118,791, filed on May 12, 2008.

(51) Int. Cl.
*B23H 3/04*     (2006.01)
*B23H 3/06*     (2006.01)
*B23H 9/14*     (2006.01)
*B23H 9/00*     (2006.01)
*B23H 3/00*     (2006.01)

(52) U.S. Cl.
CPC .. *B23H 3/00* (2013.01); *B23H 3/04* (2013.01); *B23H 3/06* (2013.01); *B23H 9/14* (2013.01); *B23H 9/00* (2013.01)
USPC ........................ 204/224 M; 205/649; 205/656

(58) Field of Classification Search
CPC .................................... B23H 3/00; B23H 3/04
USPC .............................. 204/224 M; 205/649, 656
See application file for complete search history.

(56) References Cited

U.S. PATENT DOCUMENTS

| 4,819,325 | A | 4/1989 | Cross et al. |
| 6,146,098 | A | 11/2000 | Fukuno et al. |
| 6,234,752 | B1 | 5/2001 | Wei et al. |
| 6,303,193 | B1 | 10/2001 | Guida et al. |
| 6,416,283 | B1 * | 7/2002 | Johnson et al. ............. 416/97 R |
| 6,644,920 | B2 | 11/2003 | Beeck et al. |
| 6,644,921 | B2 | 11/2003 | Bunker et al. |
| 6,680,454 | B1 | 1/2004 | Batzinger et al. |
| 7,938,951 | B2 * | 5/2011 | Lee et al. ...................... 205/665 |
| 7,964,087 | B2 * | 6/2011 | Lee et al. ...................... 205/665 |
| 2003/0006137 | A1 * | 1/2003 | Wei et al. ...................... 204/280 |
| 2008/0230378 | A1 | 9/2008 | Lee et al. |
| 2008/0230379 | A1 | 9/2008 | Lee et al. |
| 2009/0277803 | A1 | 11/2009 | Wei et al. |
| 2011/0070096 | A1 | 3/2011 | Wei et al. |

* cited by examiner

*Primary Examiner* — Paul Hyun
(74) *Attorney, Agent, or Firm* — Ann M. Agosti

(57) ABSTRACT

An electrode for an electrochemical machining process is provided. The electrode includes an electrically conductive member defining at least one passage and an insulating coating partially covering a side surface of the electrically conductive member. The insulating coating does not cover at least one of first and second exposed sections of the electrically conductive member, where the first and second exposed sections are separated by approximately 180 degrees and extend substantially along a longitudinal axis of the electrically conductive member. The insulating coating also does not cover an exposed front end of the electrically conductive member. An electrochemical machining method is also provided, for forming a non-circular hole in a workpiece using the electrode.

10 Claims, 3 Drawing Sheets

US 8,900,424 B2

ELECTRODE AND ELECTROCHEMICAL MACHINING PROCESS FOR FORMING NON-CIRCULAR HOLES

CROSS REFERENCE TO RELATED APPLICATIONS

Figure 1:
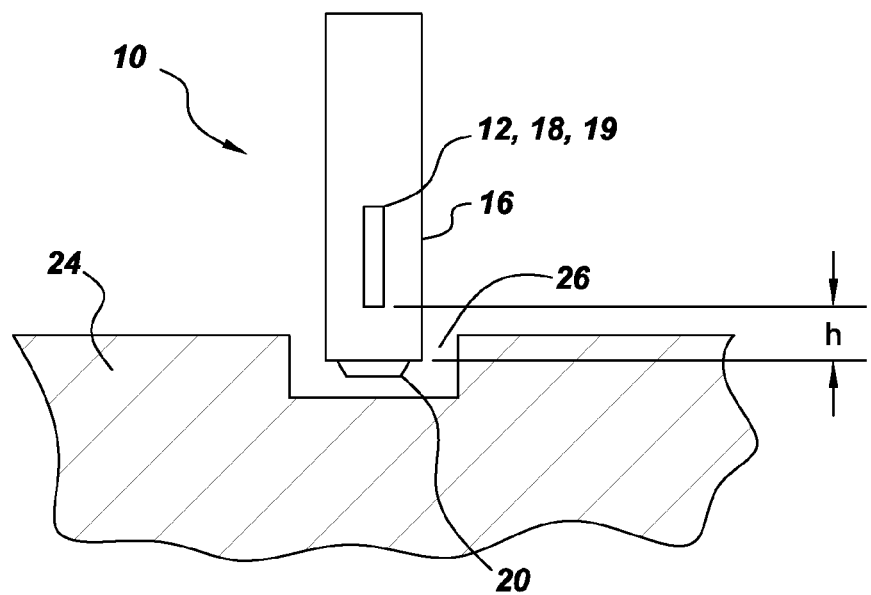

This application is a continuation in part of U.S. patent application Ser. No. 12/118,791, Bin Wei et al., entitled "Method and tool for forming non-circular holes using a selectively coated electrode," which patent application is incorporated by reference herein in its entirety.

BACKGROUND

The invention relates generally to electrochemical machining. More particularly, the invention relates to an electrode and an electrochemical machining process for forming non-circular holes.

The efficiency of a gas turbine engine is directly proportional to the temperature of turbine gases channeled from the combustor of the engine and flowing over the turbine blades. For example, for gas turbine engines having relatively large blades, turbine gas temperatures approaching 1500° C. (2,700° F.) are typical. To withstand such high temperatures, these large blades are manufactured from advanced materials and typically include state-of-the-art type cooling features.

A turbine blade is typically cooled using a coolant such as compressor discharge air. The blade typically includes a cooling hole through which the air passes. The cooling holes commonly have an aspect ratio, or depth to diameter ratio, of more than 300:1, with a diameter as small as a few millimeters.

A specialized adaptation of electrochemical machining, known as shaped-tube electrochemical machining (STEM), is used for drilling small, deep holes in electrically conductive materials. STEM is a non-contact electrochemical drilling process that can produce holes with aspect ratios more than 300:1. It is the only known method that is capable of manufacturing the small, deep holes used for cooling blades of efficient gas turbines.

In the STEM process, an electrically conductive workpiece is situated in a fixed position relative to a movable manifold. The manifold supports a plurality of drilling tubes, each of which are utilized to form an aperture in the workpiece. The drilling tubes function as cathodes in the electrochemical machining process, while the workpiece acts as the anode. As the workpiece is flooded with an electrolyte solution from the drilling tubes, material is depleted from the workpiece in the vicinity of the leading edge of the drilling tubes to form holes.

Commonly assigned U.S. patent application Ser. No. 12/118,791, which was published as US 2009/0277803, Bin Wei et al., "Method and Tool for Forming non-circular holes using a selectively coated electrode," which is herein incorporated by reference in its entirety, discloses a method for forming a non-circular hole from a substantially circular hole. However, this process requires two separate steps. First, a substantially circular hole is drilled with a traditional STEM cathode, and then another cathode is inserted into the circular hole to form the non-circular hole.

It would therefore be desirable to have a single-step STEM process to form non-circular holes. It would further be desirable to have a single cathode that can be used to perform the entire STEM process for forming the non-circular holes.

BRIEF DESCRIPTION

One aspect of the present invention resides in an electrode for an electrochemical machining process. The electrode includes an electrically conductive member defining at least one passage and an insulating coating partially covering a side surface of the electrically conductive member. The insulating coating does not cover at least one of first and second exposed sections of the electrically conductive member. The first and second exposed sections are separated by approximately 180 degrees and extend substantially along a longitudinal axis of the electrically conductive member. The insulating coating also does not cover an exposed front end of the electrically conductive member.

Another aspect of the present invention resides in an electrochemical machining method for forming a non-circular hole in a workpiece using an electrode. The electrode includes an insulating coating partially covering a side surface of an electrically conductive member, where the insulating coating does not cover at least one of first and second exposed sections of the electrically conductive member. The first and second exposed sections are separated by approximately 180 degrees and extend substantially along a longitudinal axis of the electrically conductive member. The insulating coating also does not cover an exposed front end of the electrically conductive member. The electrochemical machining method includes applying a pulsed voltage to the electrode and to the workpiece: to electrochemically remove material from the workpiece using the exposed front end of the electrically conductive member to form an initially substantially circular hole in the workpiece; and to electrochemically remove a predetermined amount of material from the initially substantially circular hole using at least one of the first and second exposed sections of the electrically conductive member to form the non-circular hole.

DRAWINGS

Figure 2:
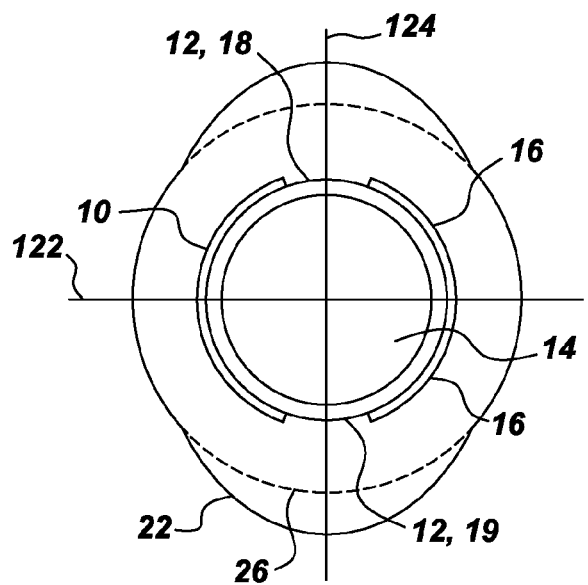
Figure 3:
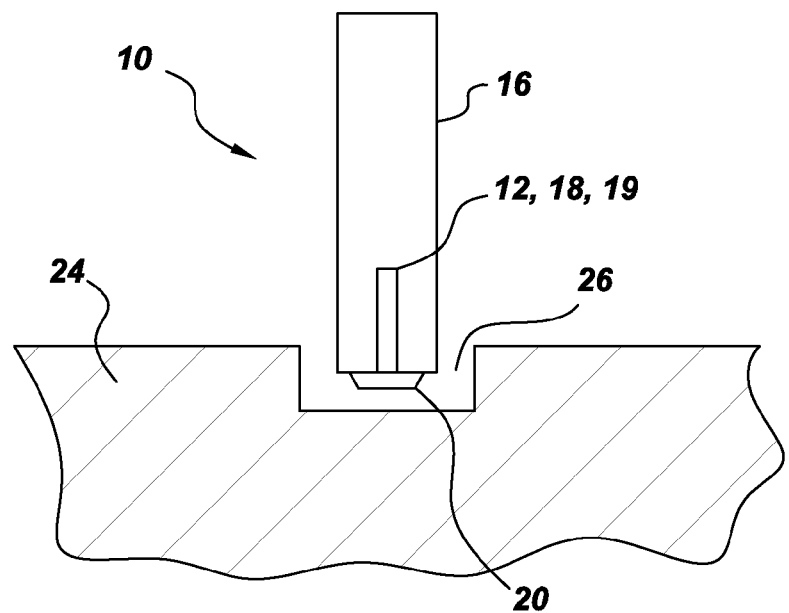
Figure 4:
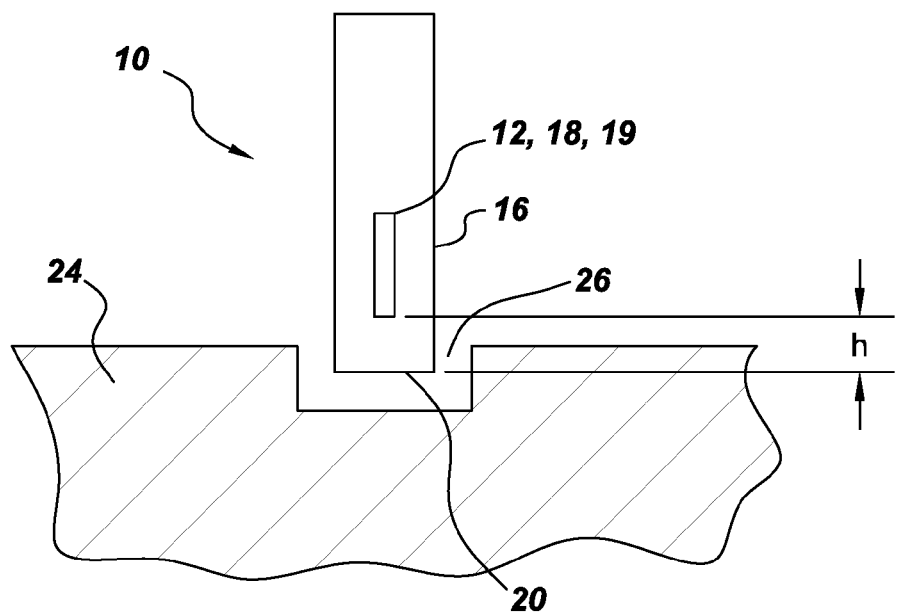
Figure 5:
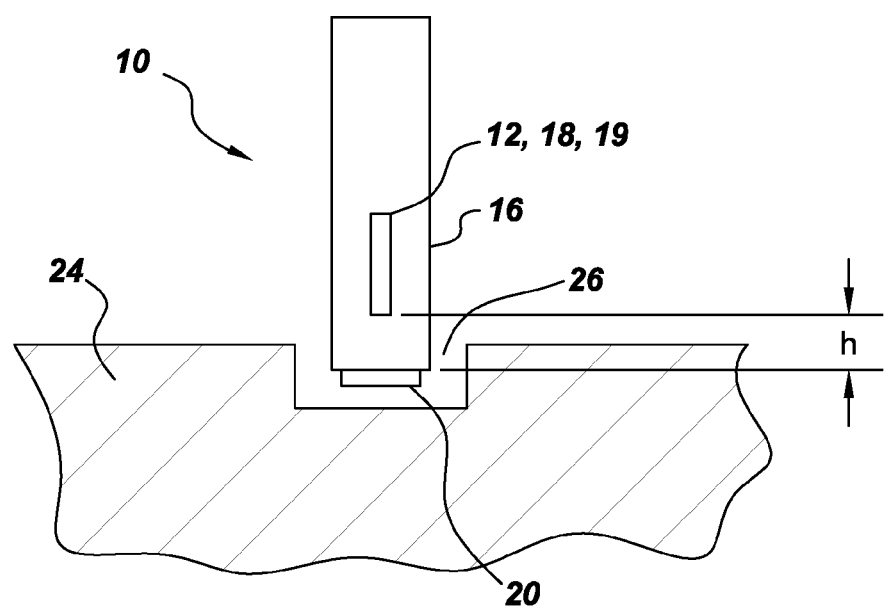
Figure 6:
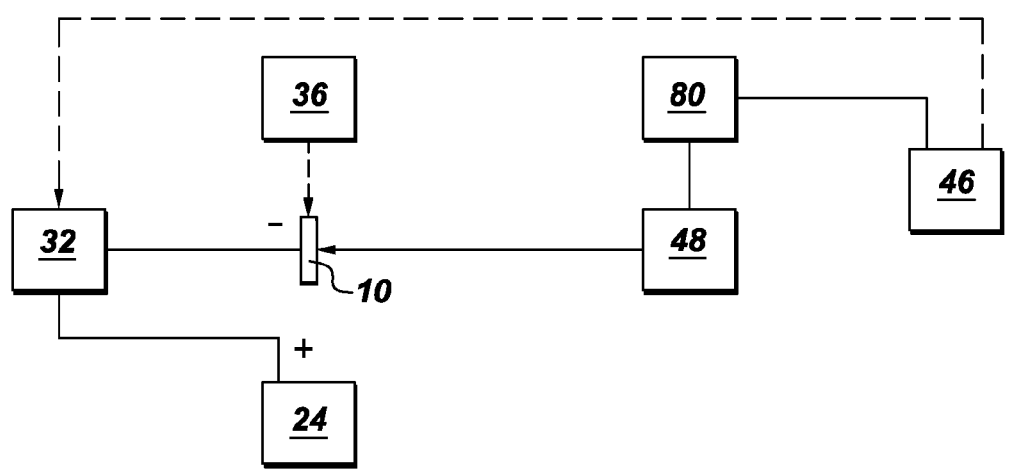

These and other features, aspects, and advantages of the present invention will become better understood when the following detailed description is read with reference to the accompanying drawings in which like characters represent like parts throughout the drawings, wherein:

FIG. 1 schematically depicts a tubular electrode for forming a non-circular hole in a single step, electrochemical machining process, where the electrode has an exposed front end, and where first and second drilling sections are separated from the exposed front end by an insulating gap h;

FIG. 2 is a cross sectional view of the electrode of FIG. 1 and shows both an initially substantially circular hole, which is machined by the front end of the electrode, and a final, elliptical hole, which is machined by the first and second drilling sections in the sidewall of the electrode;

FIG. 3 schematically depicts another tubular electrode for forming a non-circular hole in a single step, electrochemical machining process, where the electrode has an exposed front end, and where first and second exposed sections are adjacent to the exposed front end;

FIG. 4 schematically depicts another tubular electrode for forming a non-circular hole in a single step, electrochemical machining process, where the electrode has an exposed front end that is coextensive with the remainder of the electrically conductive member of the electrode, and where first and second exposed sections are separated from the exposed front end by an insulating gap h;

FIG. 5 schematically depicts another tubular electrode for forming a non-circular hole in a single step, electrochemical machining process, where the electrode has an exposed front end that is narrower than the remainder of the electrically conductive member of the electrode, and where first and second exposed sections are separated from the exposed front end by an insulating gap h; and FIG. 6 is a block diagram illustrating aspects of an electrochemical machining assembly using the tubular electrodes shown in FIG. 1, 3, 4 or 5.

DETAILED DESCRIPTION

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The modifier "about" used in connection with a quantity is inclusive of the stated value, and has the meaning dictated by context, (e.g., includes the degree of error associated with measurement of the particular quantity). In addition, the term "combination" is inclusive of blends, mixtures, alloys, reaction products, and the like.

Moreover, in this specification, the suffix "(s)" is usually intended to include both the singular and the plural of the term that it modifies, thereby including one or more of that term (e.g., "the passage" may include one or more passages, unless otherwise specified). Reference throughout the specification to "one embodiment," "another embodiment," "an embodiment," and so forth, means that a particular element (e.g., feature, structure, and/or characteristic) described in connection with the embodiment is included in at least one embodiment described herein, and may or may not be present in other embodiments. Similarly, reference to "a particular configuration" means that a particular element (e.g., feature, structure, and/or characteristic) described in connection with the configuration is included in at least one configuration described herein, and may or may not be present in other configurations. In addition, it is to be understood that the described inventive features may be combined in any suitable manner in the various embodiments and configurations.

A tubular electrode 10 for an electrochemical machining process is described with reference to FIGS. 1-5. As indicated in FIGS. 1 and 2, the electrode 10 includes an electrically conductive member 12 defining at least one passage 14. The passage 14 is configured to receive and convey an electrolyte to the machining zone. The electrically conductive member 12 typically comprises a corrosion resistant material. By "corrosion resistant," it is meant that the material is resistant to electrolytic action. Non-limiting examples of a corrosion resistant material suitable for forming electrically conductive member 12 include titanium and titanium alloys. The electrolyte for STEM machining operations is typically an acidic solution. By way of example, an acid electrolyte, such as $HNO_3$ or $H_2SO_4$ solution (8-25 weight percent) can be used.

Depending on the specific arrangement, the electrically conductive member 12 may have a circular or non-circular cross-section. Although circular tubes are typically employed, the tube tip may be slightly "crushed" into a non-circular cross-section. For example, the cross-section of the electrode may be elliptical, oval, race-track or extended oval in shape. Benefits of such non-circular cross sections include enhanced cooling for various part (workpiece 22) geometries.

As indicated in FIGS. 1 and 2, for example, the electrode 10 further includes an insulating coating 16 partially covering a side surface of the electrically conductive member. As indicated in FIGS. 1 and 2, for example, the insulating coating 16 does not cover at least one of first and second exposed sections 18, 19 of the electrically conductive member. As indicated in FIG. 2, for example, the first and second exposed sections 18, 19 are separated by approximately 180 degrees and extend substantially along a longitudinal axis of the electrically conductive member. As indicated in FIGS. 3-5, for example, the insulating coating 16 also does not cover an exposed front end 20 of the electrically conductive member 12. Non-limiting examples of the insulating coating 16 include dielectric materials, which dielectric material should preferably be smooth, of even thickness, tightly adhered to the surface of the body and free of pinholes or foreign material. Exemplary suitable dielectric materials include polyethylene, polytetrafluoro-ethylene, ceramics, varnish, and various types of rubber.

For particular configurations, the insulating coating 16 does not cover both of the first second exposed sections 18, 19 of the electrically conductive member. Namely, for this configuration, there are two exposed drilling sections 18, 19 available for drilling operations.

For other configurations, the insulating coating 16 does not cover one of the first second exposed sections 18, 19 of the electrically conductive member, such that only the respective one of the uncovered exposed sections 18, 19 is available for drilling operations. This later configuration can be used to form obloid (asymmetrical, non-round) holes, when desired.

As indicated in FIGS. 3-5, the electrode 10 may have a number of different configurations. For example, for the configuration shown in FIG. 4, the exposed front end 20 of the electrically conductive member 12 is coextensive with the remainder of the electrically conductive member 12. Namely, for the arrangement shown in FIG. 4, the exposed front end 20 of the electrically conductive member 12 and the remainder of the electrically conductive member have the same diameter. For this coextensive configuration, the exposed front end 20 will essentially not extend from the side surface but will merely be exposed on the front end. So in practice, this coextensive configuration will be essentially fully coated on the side of the cathode. For the configuration shown in FIG. 5, the exposed front end 20 of the electrically conductive member 12 has a smaller diameter than the remainder of the electrically conductive member 12. Beneficially, the configuration shown in FIG. 5 will reduce the size of the minor axis of the hole drilled by this method and therefore increase the size ratio of the major axis to minor axis of the hole. Alternatively, for the arrangement shown in FIG. 3, the exposed front end 20 of the electrically conductive member 12 is tapered. For example, the exposed front end 20 is tapered in a range of 10-30°. Beneficially, by tapering the exposed front end 20 of the electrically conductive member 12, the size of minor axis of the hole is reduced and the ratio of major axis to minor axis can be increased.

Generally, only a relatively small portion of the electrically conductive member 12 is exposed at the front end 20. For particular configurations, the exposed front end 20 of the electrically conductive member 12 is less than about 2 mm in height, and more particularly, less than about 1 mm in height. Beneficially, by exposing only a relatively narrow portion of the electrically conductive member 12 at the front end, the gap between the electrode and the hole is small enough to allow precise hole shape control.

For the example configurations shown in FIGS. 4 and 5, the exposed front end 20 of the electrically conductive member 12 is separated from first and second exposed sections 18, 19 of the electrically conductive member 12 by a gap h. For particular configurations, the gap h is at least one millimeter (1 mm). Beneficially, by separating the two machining zones (that is, the exposed front end 20 and the first and second exposed sections 18, 19 of the electrically conductive member 12), Beneficially, the gap h reinforces the insulation coating strength, which helps to prevent the coating from peeling off.

Alternatively, for the example configuration shown in FIG. 3, the exposed front end 20 of the electrically conductive member 12 is adjacent to the first and second exposed sections 18, 19 of the electrically conductive member 12. As used here, "adjacent" should be understood to mean in close proximity.

An electrochemical machining method for forming a non-circular hole 22 in a workpiece 24 using an electrode 10 is described with reference to FIGS. 1-6. Beneficially, the electrochemical machining method can be used to machine non-circular holes 22 in a workpiece 24, to enhance cooling in critical hot areas of the workpiece. The present invention is not limited to any particular workpiece 24 but rather can be used to form non-circular holes 22 in a variety of electrically conductive workpieces 22, including without limitation: gas turbine components, or buckets for stationary power generation. Example turbine engine components include, for example, turbine blades. Non-limiting examples of suitable materials for forming the electrically conductive components 22 include metals and metal alloys.

As indicated, for example, in FIGS. 1 and 2, the electrode 10 comprises an insulating coating 16 partially covering a side surface of an electrically conductive member. As described above with reference to FIGS. 1 and 2, the insulating coating 16 does not cover at least one of first and second drilling sections 18, 19 of the electrically conductive member 12. As indicated in FIGS. 1 and 2, the first and second drilling sections 18, 19 are separated by approximately 180 degrees and extend substantially along a longitudinal axis of the electrically conductive member. As described above with reference to FIGS. 3-5, the insulating coating 16 also does not cover an exposed front end 20 of the electrically conductive member 12. The electrode 10 is described in greater detail above with reference to FIGS. 1-5.

As noted above, for particular configurations, the insulating coating 16 does not cover both of the first second exposed sections 18, 19 of the electrically conductive member. Namely, for this configuration, there are two exposed sections 18, 19 available for drilling operations.

For other configurations, the insulating coating 16 does not cover one of the first second exposed sections 18, 19 of the electrically conductive member, such that only the respective one of the uncovered exposed sections 18, 19 is available for drilling operations. This later configuration can be used to form asymmetrical, non-round holes, when desired.

As indicated, for example, in FIGS. 1, 2 and 6, the electrochemical machining method comprises applying a pulsed voltage (and more particularly, a bipolar pulsed voltage) to the electrode 10 and to the workpiece 24 to electrochemically remove material from the workpiece 24 using the exposed front end 20 of the electrically conductive member 12 to form an initially substantially circular hole 26 (which is shown by the dashed line in FIG. 2) in the workpiece 24. The application of the pulsed voltage to the electrode 10 and to the workpiece 24 further electrochemically removes a predetermined amount of material from the initially substantially circular hole 26 (see FIGS. 1, 2, and 6, for example) using the first and second drilling sections 18, 19 of the electrically conductive member 12 to form the non-circular hole 22 (FIG. 2). For the electrochemical machining assembly schematically depicted in FIG. 6, the bipolar, pulsed voltage is applied across the electrode 10 and the workpiece 24 using power supply 32. More particularly, for the example arrangement shown in FIG. 6, power supply 32 is operatively connected to provide a pulsed voltage to the electrode 10 and to the workpiece 24. As used here, the phrase "operatively connected" should be understood to mean that the respective components may be connected (for example, mechanically or electrically) directly or may be connected via other components. In one non-limiting example, the power supply 32 is a bipolar, pulsed power supply.

In addition, to set up the machining operation, the workpiece 24 may optionally move relative to the electrode 10 to position the electrode 10 at the desired position. In addition, the motion controls from conventional STEM machines may be employed. The electrochemical machining method can thus be used to remove material from the workpiece 24 upon application of the pulsed voltage to the electrode 10 and to the workpiece 24.

The electrochemical machining method may further include flowing an electrolyte through the electrode 10 to flush a gap between the electrode and the workpiece 24 with an electrolyte. For particular configurations, the electrode 10 defines at least one passage 14 (FIG. 2) that is configured to receive and convey an electrolyte to the machining zone, and the electrochemical machining assembly 30 further includes an electrolyte fluid source 36 in fluid connection with the electrode for supplying an electrolyte to the electrode, as indicated in FIG. 6, for example. In one non-limiting example, the electrolyte fluid source 36 may include a pump. The electrolyte fluid source 36 may contain additional elements (not shown) for conditioning and recirculating the electrolyte, such as one or more filters (not shown).

Referring now to FIG. 2, for particular processes, the non-circular hole 22 comprises an elliptical hole 22 having a major axis 124 and a minor axis 122, and the electrochemical removal using at least one of the first and second drilling sections 18, 19 of the electrically conductive member 12 forms the major axis of the elliptical hole. That is, the removal of material from the workpiece 24 in the vicinity of first and second drilling sections 18, 19 determines the major axis of the elliptical hole 22. For particular processes, the ratio of the major axis 124 to the minor axis 122 of the elliptical hole 22 is at least 1.4. More particularly, the ratio of the major axis 124 to the minor axis 122 of the elliptical hole 22 is at least 1.5, and still more particularly, at least 1.6. For other configurations, the ratio of the major axis 124 to the minor axis 122 of the elliptical hole 22 may exceed 1.6. Further, as noted above, asymmetric non-round holes may be formed using an electrode with only one of exposed sections 18, 19 exposed.

The above-described electrochemical machining method may be performed using the electrochemical machining assembly 30 that is schematically depicted in FIG. 6, and various aspects of the electrochemical machining assembly 30 are described below. For example, and as indicated in FIG. 6, the electrochemical machining assembly 30 may further include a controller 46 operatively connected to a driver (not shown) and configured to control movement of the driver to advance and retract the electrode 10. For example and as indicated in FIG. 6, the controller 46 may be connected to a motor 48 used to drive the driver in order to advance and retract the electrode 10. For the arrangement shown in FIG. 6, the controller 46 is connected to the power supply 80 used to power the motor 48. As such, the controller 46 controls the feed-rate of the electrode(s) 10. In one non-limiting example, the controller 46 comprises a computerized numerical controller (CNC) 46, which is operatively connected to the motor 48 and to the bipolar power supply 32. Beneficially, the CNC 46 can be programmed to manipulate the driver (not shown) in a manner, which enables the workpiece 24 to be shaped via electrochemical corrosion, such that non-circular holes 22 (not shown in FIG. 6) can be quickly and economically produced.

It should be noted that the present invention is not limited to any particular controller for performing the processing tasks of the invention. For certain embodiments, the controller includes one or more processors. The term "processor," as that term is used herein, is intended to denote any machine capable of performing the calculations, or computations, necessary to perform the tasks of the invention. The term "processor" is intended to denote any machine that is capable of accepting a structured input and of processing the input in accordance with prescribed rules to produce an output. It should also be noted that the phrase "configured to" as used herein means that the processor is equipped with a combination of hardware and software for performing the tasks of the invention, as will be understood by those skilled in the art. In other embodiments, the controller is preprogrammed to perform the tasks of the invention.

For the example arrangement shown in FIG. 6, the controller 46 is operatively connected to the bipolar power supply 32 and is further configured to perform pulse train control. In this manner, the controller 46 controls the pulse duration, frequency and voltage of the pulsed voltage supplied to the electrodes 10 and workpiece 24. In addition and for particular embodiments, the controller 46 may be further configured to selectively control a feed rate for the electrode 10 and/or the pulsed voltage supplied to the electrode 10.

In addition to the features discussed above, the electrochemical machining assembly 30 may also optionally include additional elements, including without limitation, a graphical or other display, such as a CRT graphical display (not shown) to monitor signals provided by any of the components of the assembly previously described. Such a graphical or other display may provide diagnostic information to a machine operator to ascertain that each electrode is performing properly, or to fulfill some other diagnostic purpose.

Beneficially, the above-described electrode and electrochemical machining method can be used to form non-circular holes with high aspect ratios (depth to diameter) and relatively small diameters (as small as a few millimeters). Further, the above-described electrode and electrochemical machining method can be used to form non-circular holes in a single step, using a single electrode.

Although only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An electrode for an electrochemical machining process, the electrode comprising:
   an electrically conductive member defining at least one passage; and
   an insulating coating partially covering a side surface of the electrically conductive member, wherein the insulating coating does not cover at least one exposed section of the electrically conductive member, wherein the at least one exposed section extends substantially along a longitudinal axis of the electrically conductive member, wherein the insulating coating also does not cover an exposed front end of the electrically conductive member, wherein the exposed front end of the electrically conductive member is less than about 2 mm in height wherein the at least one exposed section comprises first and second exposed sections separated by approximately 180 degrees, and wherein the exposed front end of the electrically conductive member is separated from the first and second exposed sections of the electrically conductive member by a gap h of at least one millimeter (1 mm).

2. The electrode of claim 1, wherein the exposed front end of the electrically conductive member is coextensive with a remainder of the electrically conductive member.

3. The electrode of claim 1, wherein the exposed front end of the electrically conductive member has a smaller diameter than a remainder of the electrically conductive member.

4. The electrode of claim 1, wherein the exposed front end of the electrically conductive member is tapered.

5. An electrochemical machining method for forming a non-circular hole in a workpiece using an electrode, the electrode comprising an insulating coating partially covering a side surface of an electrically conductive member, wherein the insulating coating does not cover at least one exposed section of the electrically conductive member, wherein the at least one exposed section extends substantially along a longitudinal axis of the electrically conductive member, and wherein the insulating coating also does not cover an exposed front end of the electrically conductive member, the electrochemical machining method comprising:
   applying a pulsed voltage to the electrode and to the workpiece:
      to electrochemically remove material from the workpiece using the exposed front end of the electrically conductive member to form an initially substantially circular hole in the workpiece; and
      to electrochemically remove a predetermined amount of material from the initially substantially circular hole using the at least one exposed section of the electrically conductive member to form the non-circular hole.

6. The electrochemical machining method of claim 5, wherein the at least one exposed section comprises first and second exposed sections separated by approximately 180 degrees and wherein the non-circular hole comprises an elliptical hole having a major axis and a minor axis, and wherein the electrochemical removal using the first and second exposed sections of the electrically conductive member forms the major axis of the elliptical hole.

7. The electrochemical machining method of claim 6, wherein a ratio of the major axis to the minor axis of the elliptical hole is at least 1.4.

8. The electrochemical machining method of claim 5, further comprising flowing an electrolyte through the electrode to flush a gap between the electrode and the workpiece with an electrolyte.

9. The electrochemical machining method of claim 5, wherein the workpiece comprises a turbine engine component or a bucket.

10. An electrode for an electrochemical machining process, the electrode comprising:
   an electrically conductive member defining at least one passage; and
   an insulating coating partially covering a side surface of the electrically conductive member, wherein the insulating coating does not cover at least one exposed section of the electrically conductive member, wherein the at least one exposed section extends substantially along a longitudinal axis of the electrically conductive member, and wherein the insulating coating also does not cover an exposed front end of the electrically conductive member, wherein the exposed front end of the electrically conductive member has a smaller diameter than a remainder of the electrically conductive member, or the exposed front end of the electrically conductive member is tapered, or the at least one exposed section comprises first and second exposed sections separated by approximately 180 degrees and wherein the exposed front end of the electrically conductive member is separated from the first and second exposed sections of the electrically conductive member by a gap h of at least one millimeter (1 mm).

\* \* \* \* \*